(12) United States Patent
Montanari et al.

(10) Patent No.: US 6,879,882 B2
(45) Date of Patent: Apr. 12, 2005

(54) METHOD AND APPARATUS FOR THE DYNAMIC BALANCING OF A ROTATING STRUCTURE

(75) Inventors: William Montanari, Castel Maggiore (IT); Franco Danielli, Zola Predosa (IT)

(73) Assignee: Marposs, S.p.A. (IT)

( * ) Notice: Subject to any disclaimer, the term of this patent is extended or adjusted under 35 U.S.C. 154(b) by 0 days.

(21) Appl. No.: 10/488,757

(22) PCT Filed: Sep. 13, 2002

(86) PCT No.: PCT/EP02/10282

§ 371 (c)(1),
(2), (4) Date: Mar. 9, 2004

(87) PCT Pub. No.: WO03/025535

PCT Pub. Date: Mar. 27, 2003

(65) Prior Publication Data

US 2004/0243283 A1 Dec. 2, 2004

(30) Foreign Application Priority Data

Sep. 17, 2001 (IT) .................................. BO2001A0560

(51) Int. Cl.⁷ ................................................ G01M 1/38
(52) U.S. Cl. ........................................ 700/279; 73/462
(58) Field of Search .......................... 73/460–462, 468, 73/649, 650, 658, 660; 700/279, 280

(56) References Cited

U.S. PATENT DOCUMENTS

| 3,698,263 A | | 10/1972 | Ito | |
| 4,096,988 A | * | 6/1978 | Scuricini | 494/7 |
| 4,423,635 A | | 1/1984 | Senicourt et al. | |
| 4,543,463 A | | 9/1985 | Scuricini | |
| 4,653,324 A | * | 3/1987 | Nugier | 73/460 |
| 4,854,168 A | | 8/1989 | Himmler | |
| 4,868,762 A | * | 9/1989 | Grim et al. | 700/279 |
| 5,421,199 A | * | 6/1995 | Himmler | 73/462 |
| 5,688,160 A | * | 11/1997 | Pozzetti et al. | 451/5 |
| 5,853,144 A | * | 12/1998 | Vincent | 244/17.13 |
| 5,992,232 A | * | 11/1999 | Saitoh | 73/468 |

FOREIGN PATENT DOCUMENTS

| DE | 2 134 270 | 1/1973 |
| DE | 23 45 664 | 7/1975 |
| DE | 29 34 161 | 3/1981 |
| EP | 0 066 494 | 12/1982 |

* cited by examiner

Primary Examiner—Maria N. Von Buhr
(74) Attorney, Agent, or Firm—Dickstein Shapiro Morin Oshinsky LLP

(57) ABSTRACT

A method and an apparatus for balancing an elongate structure (1) rotating about an axis, like a spindle (3) carrying two grinding wheels (5, 6), wherein two vibration-detecting sensors (7, 8) and associated balancing devices (9, 10) with movable masses (11–14) are arranged at two checking sections ($S_1$, $S_2$) spaced out along the axis of rotation. Processing and control means (20) control the balancing devices on the basis of one or more signals ($V_C$; $V_{C1}$, $V_{C2}$) achieved as combination(s) of the vibrations, in module, detected by both the sensors.

15 Claims, 4 Drawing Sheets

METHOD AND APPARATUS FOR THE DYNAMIC BALANCING OF A ROTATING STRUCTURE

TECHNICAL FIELD

The present invention relates to a method for the dynamic balancing of a rotatable structure rotating about a longitudinal axis, by means of an apparatus including two vibration-detecting sensors, two associated balancing devices, and processing and control means adapted for processing signals output from the two vibration-detecting sensors and for controlling the balancing devices, the method including the steps of arranging each vibration-detecting sensor and its associated balancing device near a checking section, the two checking sections being spaced out along the longitudinal axis, and controlling the operation of the balancing devices on the basis of the signals of the two vibration-detecting sensors. The invention also relates to an apparatus for implementing said method.

BACKGROUND ART

The problem of balancing grinding wheels of grinding machines is known from time. Undesired vibrations are generally present in a grinding machine, and generated by out-of-balance conditions of the grinding wheel due to various possible reasons depending on the grinding wheel itself, like shape and/or constitution defects (inhomogeneity of the materials, concentricity errors between the external abrading surface and the internal centering hole, etc.), inaccurate assembling to the rotating spindle (hence causing the wheel center of gravity to be spaced apart from the axis of rotation), and, in general, deteriorations due to wear and/or splinter occurring during the machining of the workpieces. These vibrations may cause inaccuracies in the features of the machined workpieces—more specifically roundness errors like ovality and/or lobing—and introduce loads and stresses that may damage the machine tool.

Known balancing apparatuses, or balancers, are coupled to the grinding wheel and comprise movable masses, driven by electric motors that adjust the position of the masses, in the course of the wheel rotation, along radial or angular paths in order to compensate the previously mentioned out-of-balance conditions. The driving motors are also part of the apparatus, rotate along with it and the grinding wheel, and are power supplied and controlled by a stationary external power source, by means of an electric connection, including, for example, a brush collector and slip rings, or by means of a contactless connection, for example of the inductive type.

The characteristics (like, for example, the amplitude) of the vibrations generated as a consequence of the out-of-balance are picked up by processing the signals provided by an appropriate sensor and displayed, or processed in a proper unit (that often comprises the previously mentioned power supply source, too) for providing suitable balancing signals and for controlling the motors to drive the movable masses.

A balancing apparatus comprising the previously mentioned characteristics is disclosed in U.S. patent U.S. Pat. No. 3,698,263. The automatic balancing of grinding wheels generally takes place in a heuristic way, i.e. on the basis of cycles for displacing the two masses in the balancing device in order to continuously reduce the vibration detected by the sensor until there is obtained its complete elimination or in any case its reduction to acceptable values. For example, it is possible to control, in the course of the rotation, angular displacements of the masses, taken together and/or individually, in a direction and/or in the other, on the basis of the trend of the signal of the vibration-detecting sensor, until said signal reaches zero or a value very close to zero.

Automatic balancings using deterministic criteria—i.e. balancing procedures including the performing of test cycles allowing to calculate the arrangement (for example the angular arrangement) of the masses that is able to balance the system—are more difficult and expensive to apply to rotors of machine tools, as it is required to continuously check the arrangement (for example the angular arrangement) of the movable masses in the device. Deterministic procedures are more frequent in the manually-operated balancings, for example for balancing automobile wheels, where balancing weights are added by an operator—at angular positions indicated by visual indicators—for reducing the static out-of-balance. A deterministic procedure of this type is described in patent U.S. Pat. No. 4,854,168. However, should the longitudinal layout dimensions of the grinding wheel be greater than, or even comparable with, its diametral dimensions (as in the case of grinding wheels of centerless grinding machines), or should the machine tool have two grinding wheels coupled to the same shaft, at longitudinally spaced out positions, a single balancing device that operates, in substance, along a transversal plane is not sufficient for achieving the appropriate balancing. In fact, besides the so-called "static" out-of-balance at a specific area, it is not possible to disregard the dynamic couple balancing, caused by the fact that the axis of rotation that does not coincide, in general, with the axis of inertia of the rotating system. In similar cases it is known to utilize two balancing devices, substantially identical to each other and arranged at longitudinally separate positions, for carrying out a dynamic balancing of the grinding wheel, or of the grinding wheels/shaft system.

Patent application DE-A-2345664, which the preamble of claims 1 and 8 of the present patent application refers to, describes a method and an associated apparatus for the dynamic balancing of an elongate grinding wheel for a centerless grinding machine, along two transversal sections relative to the longitudinal axis, by means of two devices each including a vibration-detecting sensor and an associated unit with movable masses, each device being arranged at one of the two sections. Processing, power supply and control units are alternately connected to the two balancing devices, for controlling in sequence displacements of the masses of each of the devices on the basis of the signal received by the associated vibration-detecting sensor.

In general terms the apparatus and the method described in the German patent application do not achieve satisfying results. In fact, it has been realized that although every balancing operation at each of the two sections determines displacements of the associated masses such that the vibrations detected by the associated sensor are reduced to zero or to a minimum, the displacement of the masses at a section modifies, in general, the vibrations detected at the other section, in a way that directly depends on the elasticity of the support structure of the rotating mass, more specifically on the transversal elasticity to rotation. For this reason the apparatus and the method according to patent application DE-A-2345664 provide acceptable results only if applied to structures with very particular features but, in general terms, do not enable to overcome the problem of the correct dynamic balancing of rotating systems.

DISCLOSURE OF INVENTION

An object of the present invention is to provide a balancing method and an apparatus for the dynamic balancing of rotating systems, more specifically elongate structures including tools as grinding wheels, that enable to eliminate or reduce to a minimum the unwanted vibrations in a way that is rapid, safe and substantially does not depend on the structural features of the rotating system. This and other objects are achieved by a method according to claim 1, and by an apparatus according to claim 9. One of the advantages that a method according to the invention and, consequently, an associated apparatus provide is the application simplicity, that contributes to provide flexibility of use to rotating systems with tools of various shapes and arrangements.

BRIEF DESCRIPTION OF THE DRAWINGS

The invention is hereinafter described with reference to the annexed drawings, given by way of non-limiting example only, wherein.

BEST MODE FOR CARRYING OUT THE INVENTION

Figure 1:
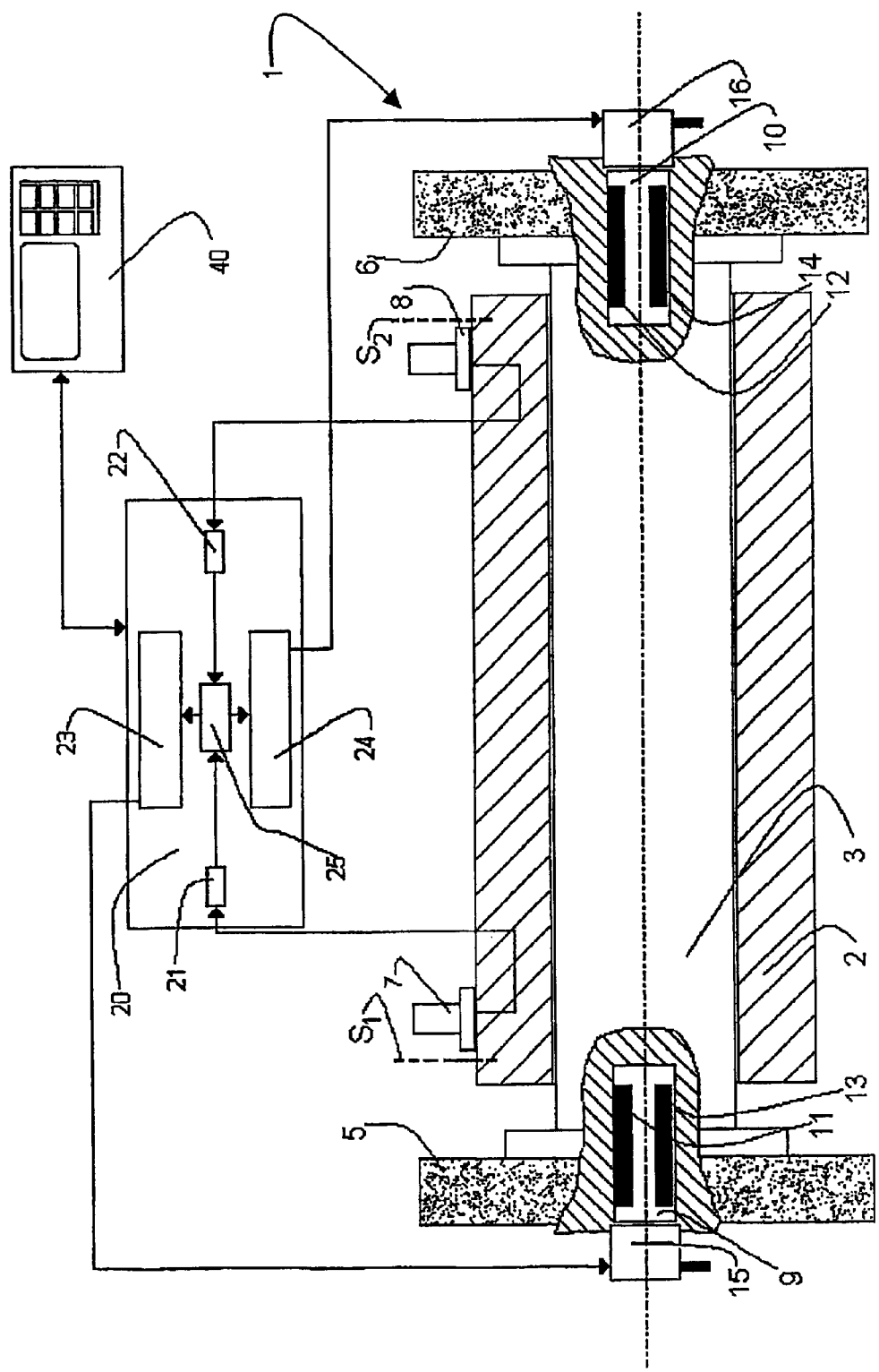
FIG. 1 shows, in simplified form, an apparatus according to the invention, in a specific application.

FIG. 1 illustrates, in simplified and partial form, an elongate rotating structure 1 that defines a longitudinal axis and includes a shaft or spindle 3 and two grinding wheels 5 and 6, coupled to the ends of the shaft 3 and spaced out along the longitudinal axis.

A grinding machine support 2, for example the wheel-carrier, defines an axis of rotation and supports the rotating structure 1 in such a way that the longitudinal axis substantially coincides with the axis of rotation, and the spindle 3, that is driven in a known way not shown in the FIG. can rotate about said axis.

Two vibration-detecting sensors 7 and 8, for example of the piezoelectric type, are fixed to the stationary support 2 near transversal checking sections $S_1$ and $S_2$, near the ends of shaft 3.

Balancing devices 9 and 10 are housed, for example, in suitable recesses at the ends of the spindle 3 near the transversal sections $S_1$ and $S_2$ and each includes a pair of eccentric balancing masses—shown in simplified form and identified by reference numbers 11, 13 and 12, 14, respectively—angularly movable about the longitudinal axis by means of associated motors, not shown in the Figure. Transmission units 15 and 16 transmit the power supply for the motors and the information relating to the required angular displacements of the masses to the balancing devices 9 and 10, by means of contactless couplings for example of the inductive type—per se known and not shown in the Figure.

Processing and control means 20 are connected to the machine logic 40. FIG. 1 shows, in simplified form, some circuits and units of the processing and control means 20, and more specifically filtering and detection circuits 21 and 22 connected to the vibration-detecting sensors 7 and 8, respectively, two processing and control units 23 and 24 connected to the balancing devices 9 and 10, respectively, and combining circuits 25. The outputs of each of the filtering and detection circuits 21 and 22 are connected to the combining circuits 25, in turn connected to both the processing units 23 and 24.

Figure 2:
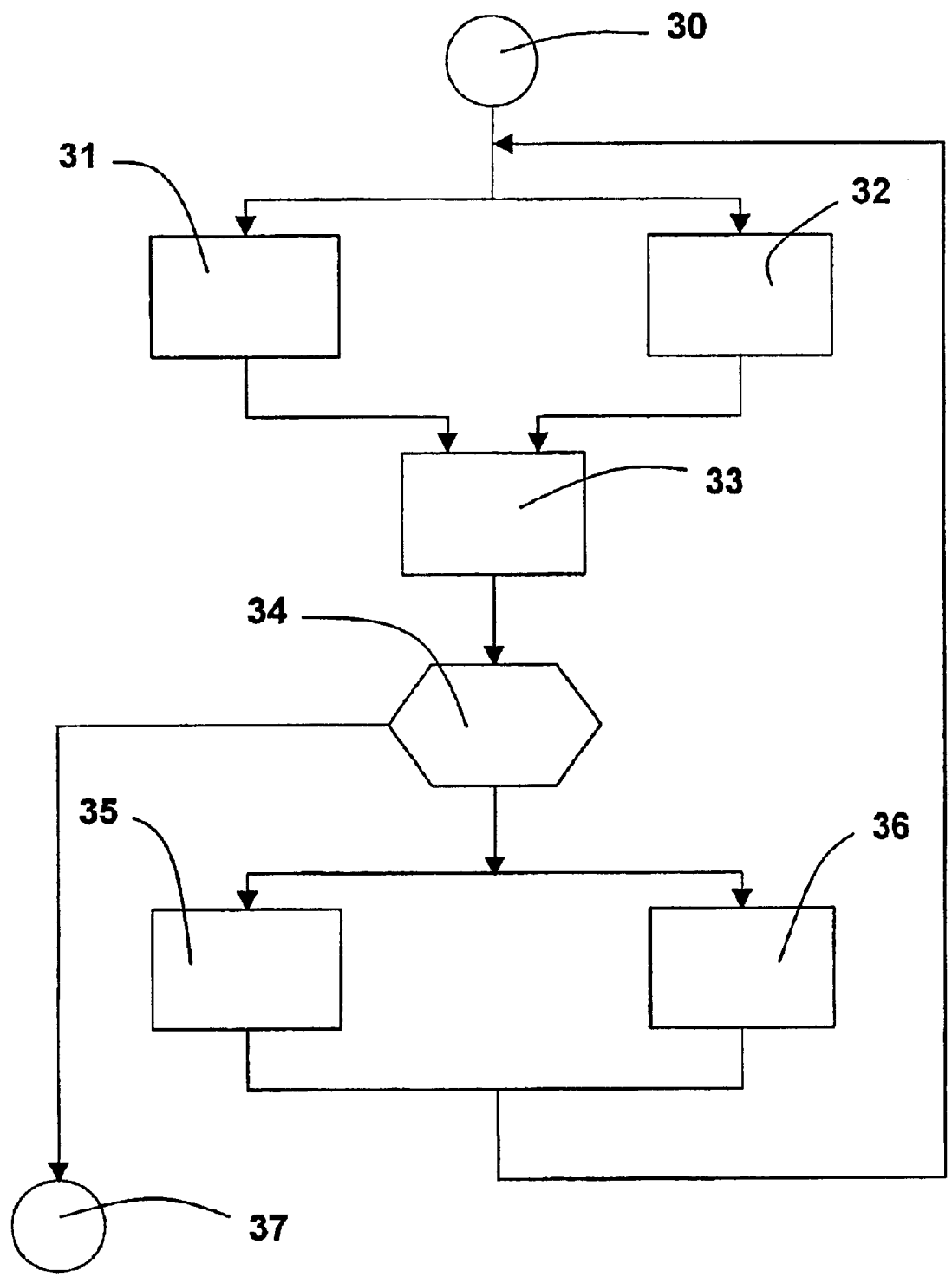
FIG. 2 is a diagram with functional blocks of a balancing method according to a first embodiment of the invention.

In FIG. 2 the functional blocks of the diagram indicate the steps of a balancing method according to the present invention and more specifically:

Block 30: start of the dynamic balancing cycle;
Block 31: filtering and detection of the signal of the vibration-detecting sensor 7 for achieving the module of the vibration detected at section $S_1$;
Block 32: filtering and detection of the signal of the vibration-detecting sensor 8, for achieving the module of the vibration detected at section $S_2$;
Block 33: combination of the achieved modules;
Block 34: comparison between the calculated combination and a pre-determined threshold value;
Block 35: control for driving the masses 11 and 13 of the balancing device 9;
Block 36: control for driving the masses 12 and 14 of the balancing device 10;
Block 37: end of the balancing cycle.

The operation of the apparatus shown in FIG. 1 according to the method indicated in FIG. 2 is as follows.

In the course of the grinding operations, a balancing cycle has to be carried out, for example, as a consequence of the substitution, or the dressing, of the grinding wheels 5 and/or 6. In any case, the decision as to whether carry out the balancing cycle is taken by an operator, or, in the example shown in FIG. 1, by the machine logic 40 that controls the start (block 30) of this cycle.

In the course of the rotation of the spindle 3, that carries the grinding wheels 5 and 6, the sensors 7 and 8 detect the vibrations at sections $S_1$ and $S_2$, respectively, and send associated signals to the processing and control means 20. More specifically, the signals of the sensors 7 and 8 are sent to the circuits 21 and 22, respectively, where, according to a known process (blocks 31 and 32), they are filtered and detected for obtaining, for example, direct voltages $V_{01}$ and $V_{02}$ indicative of the modules of the two detected vibrations.

The signals output from circuits 21 and 22 are sent to combining circuits 25 (block 33), that in turn send to both units 23 and 24 a combined signal $V_C$ that is indicative of a combination of the modules of the vibrations detected by sensors 7 and 8. The combination can be the plain sum of the signals output from circuits 21 and 22:

$$V_C = V_{01} + V_{02} \quad (1)$$

or, there can be foreseen other types of combinations, as hereinafter described.

The combined signal $V_C$ is compared with a pre-determined threshold value $V_T$ (block 34), indicative of the whole vibration considered as acceptable for the rotating system (ideally $V_T=0$). When the value of the combined signal $V_C$ is lower than the threshold value $V_T$, the balancing cycle ends (block 37).

If $V_C > V_T$, the units 23 and 24 control, by means of their associated transmission units 15 and 16, displacements of the masses 11, 13 and 12, 14 of the balancing devices 9 and 10 (blocks 35 and 36). The operation of the balancing devices 9 and 10 is controlled by the associated units 23 and 24, that control displacements of the masses 11, 13 and 12, 14 till the value of the combined signal $V_C$—that varies as the vibrations vary at sections $S_1$ and $S_2$ as a consequence of the various positions taken by the masses 11–14—reaches or becomes lower than the threshold value $V_T$.

According to an embodiment of the present invention, the method foresees that the balancing devices 9 and 10 be controlled in parallel by their associated units 23 and 24. In other words, each of the units 23 and 24 controls, in a simultaneous and independent way with respect to the other, displacements of the masses of the associated balancing devices 9 and 10, both with the aim of minimizing the value of the combined signal $V_C$.

Another embodiment of the present invention foresees a method according to which the displacements of the masses 11, 13 and 12, 14, respectively, are controlled in an alternative and sequential way by their associated units 23 and 24, till the value of the same combined signal $V_C$ reaches the threshold value $V_T$.

Figure 3A:
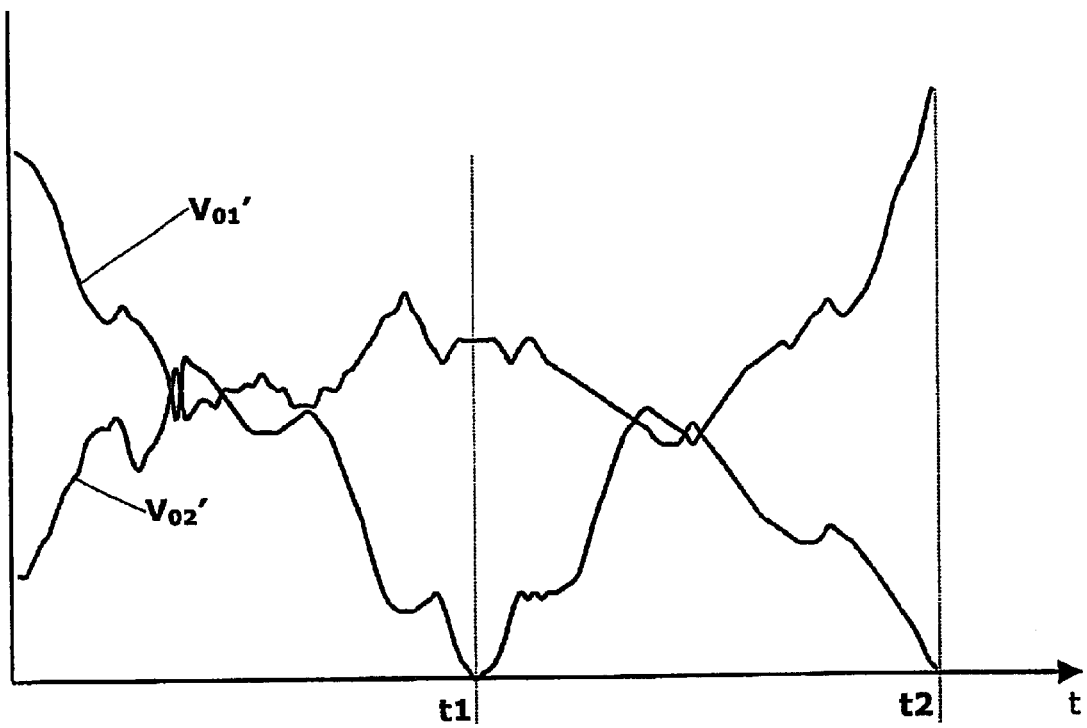
FIG. 3a is a graph representing the trend of the signals provided by the vibration-detecting sensors in the course of a known balancing cycle.
Figure 3B:
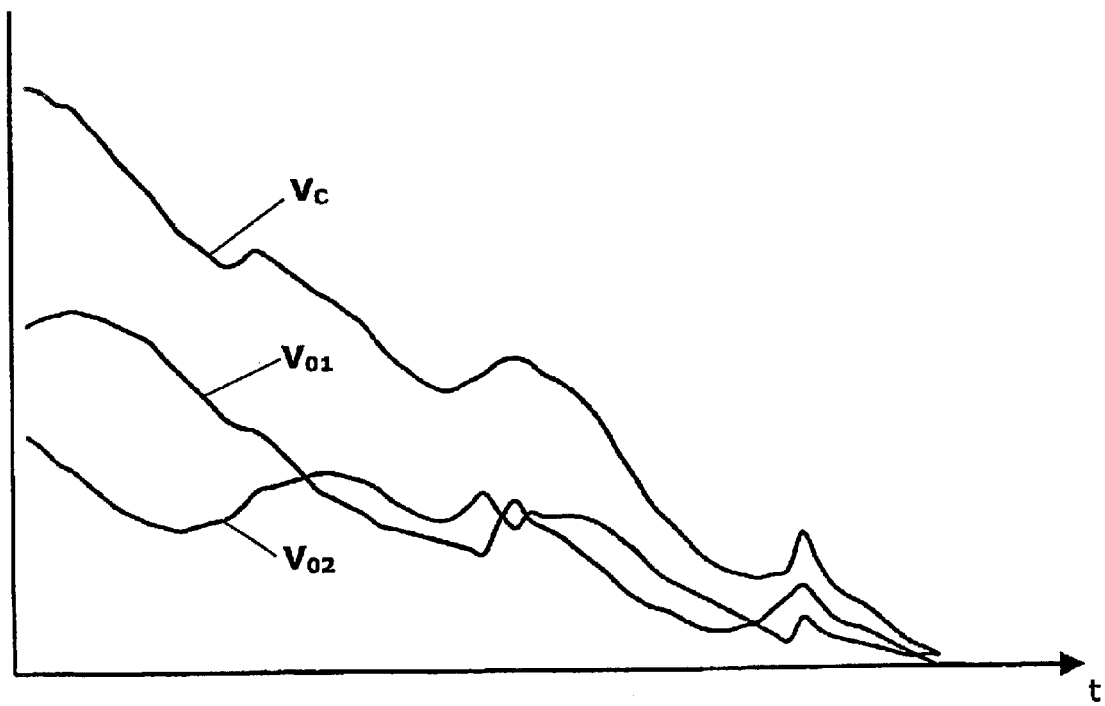
FIG. 3b is a graph representing the trend of the signals provided by the vibration-detecting sensors in the course of a balancing cycle according to the present invention.

FIG. 3b is a graph representing a possible trend in time of the modules $V_{01}$ and $V_{02}$ of the vibrations detected by sensors 7 and 8, and of the combined signal $V_C$ (in this case the sum of the modules $V_{01}$ and $V_{02}$) in a typical balancing cycle according to the method disclosed in the present invention in an application as the one shown in FIG. 1.

FIG. 3a shows, instead, the possible trend of the same values of the modules of the vibrations at the sections $S_1$ and $S_2$ (identified as $V_{01}'$ and $V_{02}'$) in an identical application, in which the applied method is substantially similar to the one described in the patent application DE-A-2345664, in other words each balancing device 9 (10) is controlled by its associated processing and control unit 23 (24) in a sequential way and on the basis of the signal of just sensor 7 (8) applied at the associated section $S_1$ ($S_2$).

The shape of the graph of FIG. 3a (known prior art) shows how, while the value of signal $V_{01}'$ of a first vibration-detecting sensor decreases to a minimum, thanks to the action of its associated balancing device in time t1, the value of the signal $V_{02}'$ of the second sensor is simultaneously changed and in general increases. In a symmetric way the subsequent actuation of the other balancing device makes the vibrations detected by the second sensor ($V_{02}'$) decrease, but causes increasing of the value of the first signal ($V_{01}'$) increase in the time interval from t1 to t2. For this reason, as a consequence of the alternative operation of the two balancing devices, even if it is repeatedly performed (and not just once, as described in DE-A-2345664), the signals of the two vibration-detecting sensors in general do not converge towards zero, or at least towards a minimum value that corresponds to the requested specifications.

The graph of FIG. 3b shows how, instead, by applying a method according to the present invention, the balancing action of both the devices 9 and 10 that tend to minimize the value of the combined signal $V_C$ leads to a convergence of the signals $V_{01}$ and $V_{02}$ of the individual sensors 7 and 8 towards the minimum requested value.

As far as the combined signal $V_C$ and the processing carried out in the combining circuits 25 are concerned, as previously mentioned there can be foreseen alternatives to the plain sum of the signals output from the filtering and detection circuits 21 and 22. More specifically, there can be foreseen linear combinations of the signals in which there is given different weight to the vibrations detected by the two sensors 7 and 8, by means of coefficients that, for instance, give more importance to the highest vibration value—and consequently to the greatest out-of-balance condition—of the two detected at sections $S_1$ and $S_2$:

$$V_C = aV_{01} + bV_{02} \tag{2}$$

It is also possible to make the coefficients vary in the course of the balancing operation, for instance for progressively increasing the importance of the lowest vibration.

Another possible combination achieved by means of the circuits 25 is represented by the square root of the sum of the squares of the values of the two signals:

$$V_C = \sqrt{V_{01}^2 + V_{02}^2} \tag{3}$$

Figure 4:
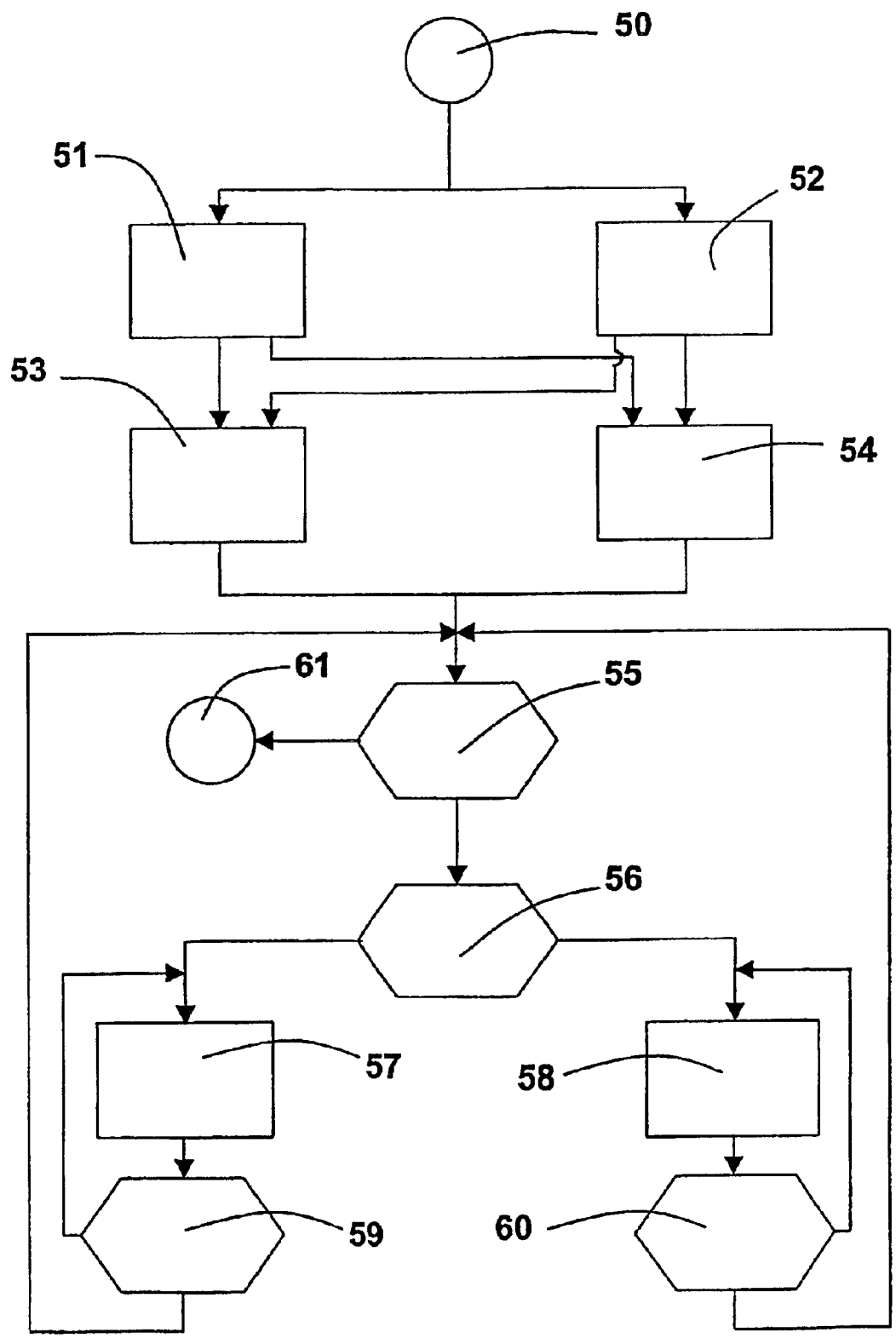
FIG. 4 is a diagram with functional blocks of a balancing method according to an alternative embodiment of the invention.

According to a further solution two different, combined signals $V_{C1}$ and $V_{C2}$ are sent to the units 23 and 24, for example two linear combinations as in formula (2), with different coefficients. A possible alternative balancing method, represented in FIG. 4, is now shortly described. After the cycle is started (block 50), and signals $V_{01}$ and $V_{02}$ are dynamically obtained (blocks 51 and 52 of FIG. 4, corresponding to blocks 31 and 32 of FIG. 2) they are processed to get combined signals $V_{C1}$ (block 53) and $V_{C2}$ (block 54), where $$V_{C1} = V_{01} + kV_{02} \tag{4}$$

$$V_{C2} = k'V_{01} + V_{02} \tag{5}$$

It may be, for instance, k=k'=½The combined signals $V_{C1}$ and $V_{C2}$ are compared with respective threshold values $V_{T1}$ and $V_{T2}$ (block 56) and when $$(V_{C1} < V_{T1}) \text{ AND } (V_{C2} < V_{T2}) \tag{6}$$

the balancing cycle ends (block 61).

If the value of at least one of the combined signals $V_{C1}$, $V_{C2}$ is not lower that the respective threshold $V_{T1}$, $V_{T2}$, the units 23 and 24 control, by means of their associated transmission units 15 and 16, displacements of the masses 11, 13 and 12, 14 of the balancing devices 9 and 10. In the example according to FIG. 4 there is a sequential procedure wherein each balancing device (e.g. 9) is controlled (block 57) in a known way until (block 59) a minimum value of the relevant combined signal $V_{C1}$ is reached, and then—if the balancing procedure needs to go on (blocks 55)—the other balancing device 10 is similarly controlled (blocks 58 and 60). Block 56 represents a test for establishing which of the two balancing devices 9, 10 must be controlled in the above-mentioned sequence.

In any case, the combinations $V_{C1}$ and $V_{C2}$ are both achieved on the basis of both the signals provided by the vibration-detecting sensors 7 and 8.

The described methods and apparatus enable to achieve the required dynamic balancing in two planes or sections in a simple and efficient way, and can be applied to elongate rotating structures of various types, including, for example, two grinding wheels coupled to an identical spindle (as shown in the example in FIG. 1), or a single elongate grinding wheel (as the one, for centerless grinding machines, shown in the previously mentioned patent application DE-A-2345664), or a single grinding wheel coupled near an end of a rotating spindle, or rotating tools of other shapes and arrangements.

The processing and control means 20 can be achieved in a different way with respect to what is shown in simplified form in FIG. 1. For example, the filtering and the detection of the signals of the sensors 7 and 8 can be carried out by circuits included in the processing and control units 23 and 24 and the latter can be mutually connected for each achieving the combination of the two obtained signals, without the need of the combining circuits 25.

Even the balancing devices—one or both—can have different shape and structure with respect to those (9 and 10) shown in FIG. 1, and can be, for example, coupled externally to their associated grinding wheel 5 and/or 6 instead of at the interior of the spindle 3, or include masses translating in transversal directions instead of rotating, or have other per se known characteristics.

What is claimed is:

1. A method for the dynamic balancing of a rotatable structure rotating about a longitudinal axis, by means of an apparatus including two vibration-detecting sensors, two associated balancing devices, and processing and control means adapted for processing signals output from said two vibration-detecting sensors and for controlling said balancing devices, the method including the steps of:

arranging each vibration-detecting sensor and its associated balancing device near a checking section, the two checking sections being spaced apart along said longitudinal axis, and controlling the operation of the balancing devices on the basis of the signals of the two vibration-detecting sensors, wherein the signals of the two vibration-detecting sensors are processed together for achieving one or more combined signals, and operation of said two balancing devices is controlled on the basis of values of said one or more combined signals.

2. The method according to claim 1, wherein the operation of the two balancing devices is controlled simultaneously and independently with respect to each other.

3. The method according to claim 1, wherein the operation of the two balancing devices is controlled in a sequential way with respect to each other.

4. The method according to claim 1, wherein the signals of the two vibration-detecting sensors are processed together for achieving just one of said one or more combined signals, and the operation of said two balancing devices is controlled on the basis of values of said just one combined signal.

5. The method according to claim 1, wherein the signals of the two vibration-detecting sensors are processed for achieving said one or more combined signals as one or more combinations of magnitudes of signals indicative of vibrations at said two checking sections.

6. The method according to claim 5, wherein at least one of said one or more combined signals is obtained as the sum of said magnitudes of signals.

7. The method according to claim 5, wherein at least one of said one or more combined signals is obtained as the square root of the sum of the squares of said magnitudes of signals.

8. The method according to claim 5, wherein said one or more combined signals are obtained as one or more linear combinations of said magnitudes of signals.

9. An apparatus for the dynamic balancing of a rotating structure rotating about a longitudinal axis, including two vibration-detecting sensors and two associated balancing devices, the vibration-detecting sensors and the associated balancing devices being arranged near checking sections spaced apart along said longitudinal axis, and processing and control means adapted for processing the signals output from said two vibration-detecting sensors for achieving one or more combined signals, and for controlling the operation of said balancing devices on the basis of values of said one or more combined signals, wherein said processing and control means includes two processing and control units, each processing and control unit being adapted to control one of said balancing devices.

10. The apparatus according to claim 9, wherein each of said balancing devices includes balancing masses movable under the control of the associated processing and control units.

11. The apparatus according to claim 10, wherein each of said balancing devices includes a pair of said balancing masses, the masses being eccentric with respect to the longitudinal axis and angularly movable about the longitudinal axis.

12. The apparatus according to claim 9, including filtering and detection circuits, adapted for receiving signals sent by the vibration-detecting sensors and for providing signals indicative of a trend of associated magnitudes of signals.

13. The apparatus according to claim 9, for the dynamic balancing of a rotating structure of a grinding machine including a spindle and two grinding wheels coupled to the spindle at positions spaced apart along the longitudinal axis, wherein said balancing devices are coupled to the grinding wheels and are rotatable with the grinding wheels.

14. A method for the dynamic balancing of a rotatable structure rotating about a longitudinal axis, by means of an apparatus including two vibration-detecting sensors and two associated balancing devices arranged near associated checking sections spaced apart along said longitudinal axis, the method including the steps of:

processing signals of the two vibration-detecting sensors for achieving one or more combined signal, and controlling the operation of the balancing devices on the basis of said one or more combined signals.

15. The method according to claim 14, wherein the signals of the two vibration-detecting sensors are processed for achieving said one or more combined signals as one or more combinations of magnitudes of signals indicative of the vibrations at said two checking points.

* * * * *